United States Patent [19]

Atkinson

[11] 4,295,345
[45] Oct. 20, 1981

[54] COOLING CONTAINER FOR CANNED BEVERAGES

[76] Inventor: Lyle H. Atkinson, 3828 Pavant Dr., Salt Lake City, Utah 84120

[21] Appl. No.: 142,384

[22] Filed: Apr. 21, 1980

[51] Int. Cl.³ .............................................. F25D 3/08
[52] U.S. Cl. ...................................... 62/371; 62/457; 206/427
[58] Field of Search .......................... 62/371, 457, 530; 206/427

[56] References Cited

U.S. PATENT DOCUMENTS

| | | | |
|---|---|---|---|
| 1,095,023 | 4/1914 | Parker | 62/457 |
| 2,730,151 | 1/1956 | Smith | 62/457 |
| 3,605,435 | 9/1971 | Taylor | 62/457 |
| 3,974,658 | 8/1976 | Starrett | 62/530 |
| 4,050,264 | 9/1977 | Tanaka | 62/457 |
| 4,213,310 | 7/1980 | Buss | 62/457 |

*Primary Examiner*—Ronald C. Capossela
*Attorney, Agent, or Firm*—K. S. Cornaby

[57] ABSTRACT

A reusable concave container for carrying and cooling canned beverages having a bottom section containing a plurality of cylindrical compartments, a top section containing corresponding compartments having a slow warming cooling gel in the upper end thereof, and a shoulder strap for carrying the container.

7 Claims, 5 Drawing Figures

U.S. Patent   Oct. 20, 1981   4,295,345
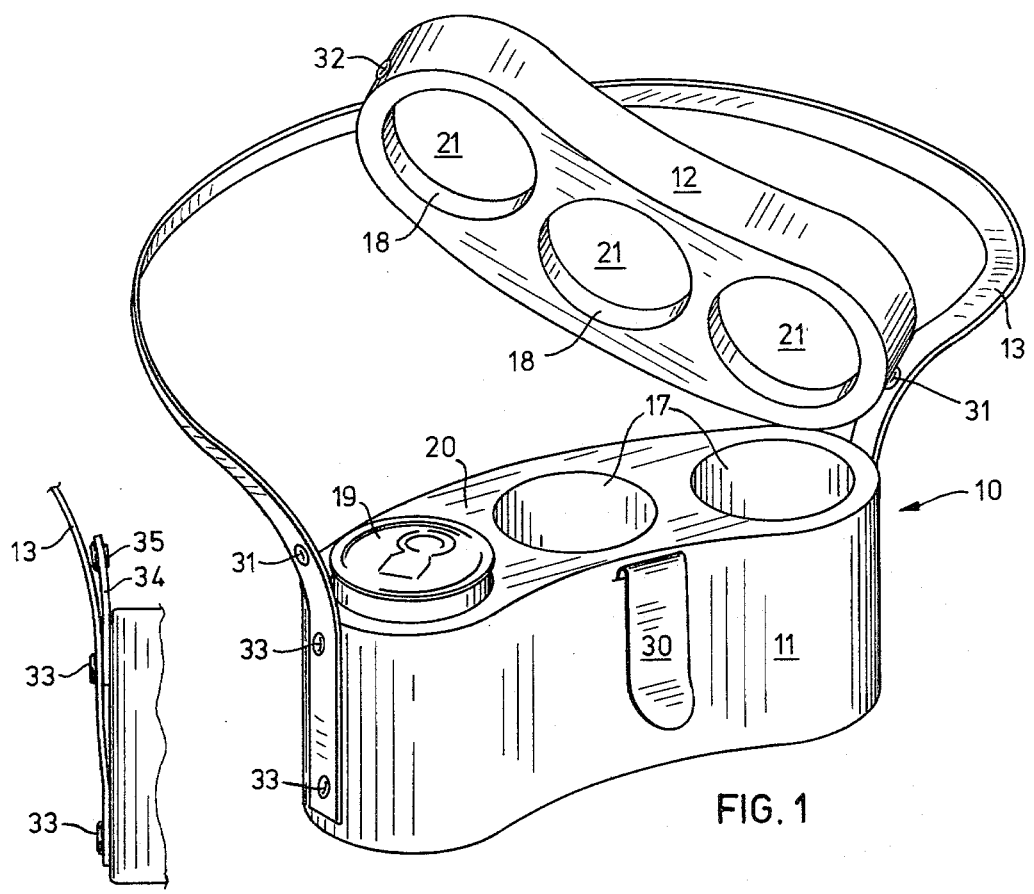
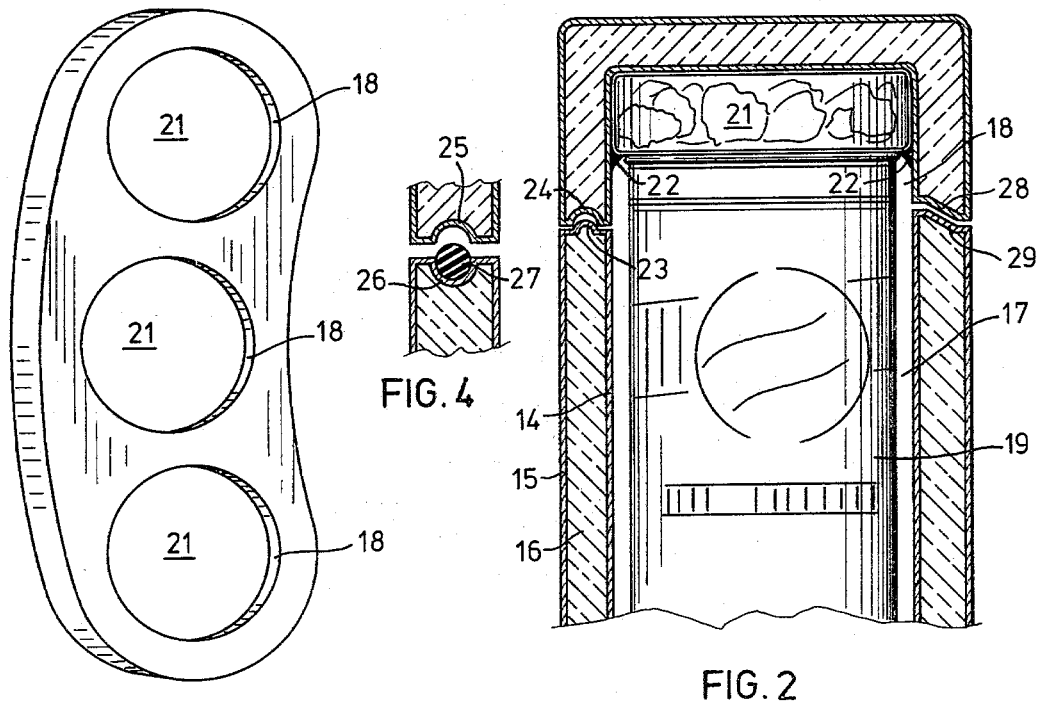

COOLING CONTAINER FOR CANNED BEVERAGES

BACKGROUND OF THE INVENTION

It is often desirable to take cold drinks along when hiking, fishing, traveling or the like. Consequently, the present invention provides a lightweight, reusable container for carrying and cooling canned beverages.

Prior art cooling containers such as those described in U.S. Pat. Nos. 3,401,535; 3,406,532; 3,436,932; 3,605,435; 3,703,816; and 3,802,220, employ slow warming cooling gels or other means of cooling, and come in a variety of designs and configurations, but none has contemplated use of the principle that heat rises and cold drops to more effectively retain canned beverages in a cold state. Moreover, none has recognized that the handling of bulky packages of freezing gels, such as "Blue Ice", can be an undesirable problem in refrigerator freezing compartments.

To prepare the cooling means for use it is necessary to place that part of the unit which contains the cooling means in a freezer; most likely the freezer compartment of a refrigerator. The present invention incorporates the cooling means in its lid which is not much larger than an ice cube tray. This is a significant improvement over the arrangements described in U.S. Pat. Nos. 3,401,535; 3,436,932; and 3,605,435, all of which have the cooling means located in the relatively large bottom portion of the container. Such an arrangement requires that a substantial amount of space be made available in the user's freezer compartment in order to prepare the cooling means for use. In addition, the cooling means of prior art containers are of considerable size and require long periods of time to freeze whereas the cooling means of the present invention requires only a few hours to be made ready for use.

It is an objective of the present invention to provide means for delivering heavier cold air to the lower portions of cooling compartments to surround the beverage cans with cold air.

SUMMARY OF THE INVENTION

According to the present invention a cooling container is provided with a housing having a preferably concave shape, such that it can rest comfortably on the user's hip when carried from the shoulder by means of the provided carrying strap or with the provided clip for attachment to the user's belt. It is contemplated that the housing be constructed of a suitable, lightweight insulating material, thus providing a durable, low cost product to the consumer.

Broadly stated, the invention comprises a top section or closure, bottom section or receptacle, and a carrying means. The top section contains a plurality of recessed cavities, each of which contains a cooling gel, such as "Blue Ice" of the type disclosed in U.S. Pat. Nos. 2,800,454; 2,800,455; and 2,803,115. Incorporated into the bottom section are compartments for securing the items to be cooled, the number of compartments being equal to the number of cavities in the top section. To the receptacle is attached a carrying means, such as a shoulder strap or belt clip, or both.

The top section of the present invention is detachable from the bottom section, so that it may be prepared for use by placement in a freezer for a time sufficient to freeze the coolant gel. In use, the beverages to be kept cold are inserted into the compartments of the bottom section, the top section is placed on top of the receptacle—the cooling means having been previously readied for use—and means for securing the closure to the receptacle fastened. The cold from the cooling gel can then descend from the top section within each compartment, and can surround each beverage can with cold to retain the beverage in each can in a cold state for a lengthy period of time.

Further objects and features of the invention will become apparent from the following detailed description, taken together with the accompanying drawings.

BRIEF DESCRIPTION OF THE DRAWINGS

A preferred embodiment for carrying out the invention is illustrated in the accompanying drawings, in which:

FIG. 1 is an elevational perspective view of the invention showing the upper section partially removed.

FIG. 2, an end elevational sectional view of the cooling container.

FIG. 3, a perspective view of the top section of the container.

FIG. 4, an exploded side elevational view of an alternate embodiment of the sealing means between the top and bottom sections; and FIG. 5, a fragmentary side elevational section corresponding to a portion of FIG. 1 showing an alternate embodiment of the fastening means for the top section.

DETAILED DESCRIPTION OF THE PREFERRED EMBODIMENTS

As illustrated in FIG. 1, a cooling container 10 in accordance with the invention has a bottom section or receptacle 11, a top section or closure 12, and a shoulder strap 13 as a means of carrying the invention. Preferably the receptacle 11 and closure 12 are formed of a suitable lightweight insulating material, for example, high-input polystyrene, polyethylene or polypropylene, whereas the carrying strap 13 may be fashioned from any suitable plastic or leather material.

As seen in FIG. 2, the container 10 comprises an inner shell 14 and outer shell 15 the space between the shells is filled with an efficient insulating material 16 such as polyurethane foam.

As shown in FIGS. 1, 2 and 3, the inner shell 14 and outer shell 15 form vertically extending receiving compartments 17 in the receptacle 11 and recessed cavities 18 in the closure 12. The receiving compartments 17 are adapted to receive cans of beverages 19 to be cooled, the depth of compartments 17 being such that the upper portion of the can of beverage 19 extends slightly above the upper surface 20 of receptacle 11 thereby facilitating easy removal of canned beverage 19. Within the recessed cavities 18 of the closure 12 are located cooling means 21 which is prepared for use by placing the detachable closure 12 in the freezer compartment of a refrigerator. A preferred coolant is a slow-thawing cooling gel, known as "Blue Ice". Each pocket of cooling gel 21 in recessed cavities 18 is secured therein after manufacture in proper shape and form by means of a small securing rim 22 or bead of securing material around the edge of cavities 18, as seen most clearly in FIG. 2.

In use, closure 12 is placed over receptacle 11 in a manner such that the recessed cavities 18 of the closure 12 encase the exposed portion of the cans of beverages 19 located in the receiving compartments 17 of receptacle 11. Cooling means 21 having previously been frozen, imparts cooling within the individual compartments 17 of sealed container 10 by cooling air adjacent to it which in turn descends to the lower portions of the compartments until equilibrium is achieved and the cans of beverages thus are surrounded by a body of cold air.

Because the present invention contemplates use while the user is engaged in activities such as hiking or sightseeing, several means are employed to ensure an effective seal between receptacle 11 and closure 12 and to prevent accidental dislodgment of closure 12.

One such means provides an interlocking seal between the receptacle 11 and closure 12 designed to minimize loss of cold air, thereby increasing the efficiency of cooling means 21. It is contemplated a tongue 23 and groove 24 arrangement be employed whereby a tongue 23 situated on the upper surface of the receptacle 11 is received by a groove 24 on the lower portion of the closure 12. A variation of such arrangement is illustrated in FIG. 4 where there is an upper groove 25 and lower groove 26. A rubber or neoprene O-ring 27 is inserted into the lower groove 26 such that it serves the same purpose of the tongue 23 described above. Such arrangement has the advantage of allowing replacement of the O-ring should the seal become ineffective. A third embodiment shown in FIG. 2, contemplates a flange 28 situated on the outer edge of the closure 12 joining with an annular depression 29 located on the outer edge of receptacle 11.

A further means for securing the closure 12 to the receptacle 11 is accomplished by a belt 30 clip disposed preferably on the concave side of receptacle 11. A carrying strap 13, as shown in FIG. 1, which is attached to opposite ends of the receptacle 11, also provides a means for securing the closure 12 to the receptacle. At each end of the strap 13 is a snap fastening 31 located such that when the closure 12 is placed on the receptacle 11 it aligns with a receiving portion of the fastening snap 32 situated on the closure 12. It is further contemplated that carrying strap 13 can be removed by using snap-type fasteners 33 to secure the strap 13 to receptacle 11.

As shown in FIG. 5, an alternative fastening means utilizes a second strap 34 extending a short distance upwardly from receptacle 11. Strap 34 has a snap fastener 35 near the upper end thereof for attachment to snap fastener 32 of closure 12, so that closure 12 can be fastened to receptacle 11 while strap 13 is removed altogether and the belt clip 30 is used to secure the container 10 to the user's belt.

Although preferred embodiments of the invention have been herein disclosed, it is to be understood that the present disclosure is made by way of example and that variations are possible without departing from the scope of protection defined in the attached claims.

I claim:

1. A portable cooling container for transporting and cooling canned beverages, comprising in combination:
a curved bottom housing having a plurality of vertically oriented compartments for holding canned beverages, said housing having walls of insulating material which entirely surround each of said compartments;
a correspondingly curved top housing having walls of insulating material and having a plurality of recessed cavities therein corresponding to said vertically oriented compartments in said bottom housing;
a slow-thawing cooling gel disposed in the upper ends of each respective recessed cavity;
sealing means for sealing the interface between said top housing and said bottom housing; and
means for attaching said bottom housing to said top housing.

2. A container as set forth in claim 1, wherein said sealing means comprises a tongue and groove arrangement at the interface of said top and bottom housings.

3. A container as set forth in claim 1, wherein said sealing means comprises a rubber "O"-ring between said top and bottom housings.

4. A container as set forth in claim 1, wherein said attaching means comprises a carrying strap with means for attaching said strap to both the top and bottom housings.

5. A container as set forth in claim 1, including a separate strap means for attachment of the top and bottom housings together in addition to said carrying strap.

6. A container as set forth in claim 1, including means for attaching said container to a user's belt.

7. A container as set forth in claim 6, wherein said means for attaching to a user's belt comprises hook means attached to said bottom housing.

* * * * *